United States Patent
Yosuke

(10) Patent No.: US 7,432,947 B2
(45) Date of Patent: Oct. 7, 2008

(54) APPARATUS AND METHOD OF ELECTROPHOTOGRAPHIC PRINTING EMPLOYING DIFFUSIVE LIGHT SOURCES AND APPARATUS AND METHOD OF SCANNING A DOCUMENT

(75) Inventor: Mizuyama Yosuke, Cambridge, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 244 days.

(21) Appl. No.: 11/136,451

(22) Filed: May 25, 2005

(65) Prior Publication Data

US 2006/0268097 A1 Nov. 30, 2006

(51) Int. Cl.
B41J 15/14 (2006.01)
B41J 27/00 (2006.01)
(52) U.S. Cl. .............................. 347/244; 347/258
(58) Field of Classification Search ............ 347/233, 347/241, 258, 230, 244, 256; 359/668; 399/186
See application file for complete search history.

(56) References Cited

U.S. PATENT DOCUMENTS 4,530,574 A * 7/1985 Scifres et al. ............... 359/668

(Continued)

FOREIGN PATENT DOCUMENTS

JP 2004195676 7/2004

(Continued)

OTHER PUBLICATIONS

K. Matsuda, et al.; "High-speed Color Printer Engine," OKI Technical Review, Apr. 2003/Issue 194 vol. 70, No. 2, pp. 34-37.

Primary Examiner—Hai C Pham
(74) Attorney, Agent, or Firm—Dickinson Wright, PLLC

(57) ABSTRACT

An electrophotographic imaging system and method employs an array of diffusive light sources, a first lens disposed to receive light emitted from two or more of the light sources of the array, an aperture plate disposed to receive light from the first lens, and a second lens disposed to receive the light after passing through the plurality of apertures and to focus the light onto an image plane. An optical scanner system and method employs a first lens disposed to receive light emitted from two or more image pixels on a document; an aperture plate disposed to receive light from the first lens, the aperture plate comprising a plurality of apertures each for passing light emitted by a respective one of the diffusive light sources of the array and for blocking light from other ones of the diffusive light sources; a second lens disposed to receive the light after passing through the plurality of apertures and to focus the light onto an image plane; and a photodetector disposed at the image plane to receive light from the second lens. The aperture plate includes a plurality of apertures each for passing light emitted by a respective one of the diffusive light sources of the array and for blocking light from other ones of the diffusive light sources. The first lens may be achromatic and the second lens may have a structure that eliminates chromatic aberration. The first lens can be cut in first planes at both edges with a distance from an axis of the first lens to make contact surfaces for adjacent first lenses. The first lens can also be cut in second planes orthogonal to the first planes. The array of light sources can comprise an interlaced layout of diffusive light sources, with the first lenses and the apertures arranged in a matching interlaced layout to that of the diffusive light sources.

29 Claims, 13 Drawing Sheets

U.S. PATENT DOCUMENTS

| | | | |
|---|---|---|---|
| 4,734,734 A * | 3/1988 | Yano | 399/186 |
| 5,471,236 A * | 11/1995 | Ito | 347/233 |
| 5,539,444 A * | 7/1996 | Ikeda et al. | 347/241 |
| 6,369,845 B1 * | 4/2002 | Kubota et al. | 347/258 |
| 6,646,670 B2 | 11/2003 | Toyohara et al. | |
| 2004/0169718 A1 | 9/2004 | Yaji | |
| 2004/0233271 A1 | 11/2004 | Nojima et al. | |

FOREIGN PATENT DOCUMENTS

| | | |
|---|---|---|
| JP | 2004195677 | 7/2004 |

* cited by examiner

APPARATUS AND METHOD OF ELECTROPHOTOGRAPHIC PRINTING EMPLOYING DIFFUSIVE LIGHT SOURCES AND APPARATUS AND METHOD OF SCANNING A DOCUMENT

BACKGROUND OF THE INVENTION

1. Field of the Invention

The present invention relates to electrophotographic printing using diffusive light sources and document image capturing or scanning.

2. Description of the Related Art

There are several types of electronic printing devices, for example, wire dot printers, electrophotographic printers, and inkjet printers. Currently, electrophotography and inkjet are two leading electronic printing systems for use in office, home, small office-home office (SOHO) or industrial environments. Electrophotographic printing devices are of relatively faster printing speed and are capable of massive print jobs, while inkjet printers are for relatively slower and smaller print jobs but provide very high printing quality.

Electrophotography is a method of printing electronic information using a series of basic steps: exposure, development, and image transfer, just like photography. A laser printer is a typical commercial machine making use of electrophotography. The basic configuration of a conventional laser printer is depicted in FIG. 20.

A laser printer includes a laser 1 as a light source, an optical system including a polygon mirror 3 and an f-theta lens 5, an organic photo conductor (OPC) drum 7, a developing station 9 including coloring toner particles 11 and paper 13. The laser 1 is a single light source and emits a coherent laser beam that strikes a surface of polygon mirror 3. Polygon mirror 3 rotates at a predetermined speed to deflect the incoming beam to OPC drum 7 through f-theta lens 5 to raster scan the electronic data line-by-line. OPC drum 7 is electrically charged by an electric charger 2 located at an up-rotation position before the laser beam strikes the surface of OPC drum 7. Upon illumination of the laser beam on the OPC drum surface, the illuminated portion changes to be neutralized due to a mechanism of organic photo conduction wherein electric current is created by a photo-conducting effect. This process is called exposure, and the charges after exposure make an image corresponding to the original electronic data. This image is called a latent image Then, coloring toner particles, which have opposite polarity of electric charge compared to the latent image, are attracted to OPC drum 7 by electrostatic forces to create a real image; this is called the development stage. After development, the real image with toner particles is transferred onto a medium such as paper to finalize a print operation.

Recently, laser printers have become much smaller as a result of reduction of the number of parts and compact design. Another effort to reduce the size of electrophotographic printers is to replace the laser source with a line of light sources commensurate with a full page width of a paper sheet. This use of a linear array of light sources leads to elimination of the optical unit, which includes polygon mirror 3 and f-theta lens 5 and which occupies a relatively large space and volume.

The LED printer is this kind of new electrophographic printer in which an LED array head commensurate with a full width of a paper sheet is used as the light source and therefore the polygon mirror and f-theta lens are eliminated. An example of such a printer is US 2004-0169718A1. As an alternative light source for the electrophotographic printer, an organic electro-luminescence (OEL) light source may be used. JP 2004-195676A2 (corresponding to US 2004-0233271A1) discloses an OEL print head that includes an array of electro-luminescent (EL) light sources and an array of individual small lenses.

These EL light sources are formed on a planar substrate by a common technique using general semiconductor processes with relatively cheap cost in any length of array. But it has been difficult to extract light efficiently from this type of light emitting device because the EL source is a planar light source with Lambertian light emitting characteristics rather than a point light source with limited emission angle like a laser. This type of light source is sometimes called a diffusive light source.

In general, a diffusive light source is a planar light source that has a wide range of emission angles. Some types of diffusive light sources emit light subject to the Lambertian law and hence are called Lambertian light sources. The radiance (power per unit square meter per unit solid angle) of a Lambertian light source at an angle from the normal with respect to the plane of light source I($\theta$) is expressed as:

$$I(\theta)=I_0 \cos \theta (W/m^{2 \cdot sr}), \quad (1)$$

where $I_0$ denotes central radiance at the orthogonal direction with respect to the plane of the light source. This formula means that a Lambertian light source emits light in all directions in a hemisphere around the light source. For example, the intensity of the light at 60 degrees from the orthogonal direction is still one half of that at the orthogonal direction. This property of a Lambertian light source has given rise to a problem that "modulation" is likely to be very poor compared to a laser light source. Modulation Mod is, in the context of electrophotography, defined as a measure of how the images on the OPC drum from two light sources set apart at a certain distance on the light source array are distinguishable (see FIG. 21), and is expressed in a formula as:

$$\text{Mod}=(I\text{max}-I\text{min})/(I\text{max}+I\text{min}), \quad (2)$$

where Imax and Imin are the maximum intensity and minimum intensity, respectively, and P1 and P2 are the positions of two separate light sources with separation |P2−P1|.

Modulation determines the resolution of the image printed. When a Lambertian light source is used in an array of light sources, modulation is quite poor because the Lambertian light source has such a wide emission angle that a considerable amount of stray light from adjacent light sources tends to interfere with the other light source. This has been a problem when diffusive light sources are employed.

Another problem with a Lambertian light source is efficiency of usage of light power. The total power in a cone with half cone angle $\theta_0$ around the normal of the plane of light source P($\theta_0$) is calculated by integrating Equation (1) to give:

$$P(\theta_0)=\pi I_0 \sin^2 \theta_0 (W/m^2) \quad (3)$$

This formula indicates that a Lambertian light source emits only one half of all power in 45 degrees of half cone angle around the normal. This also means that the rest of the half power of light is outside the cone. In conjunction with the difficulty of achieving a good modulation, efficient use of Lambertian light is also a serious problem to be solved.

There are only a few prior art references that even address this problem. JP 2004-195676 (corresponding to US 2004-0233271A1) and JP 2004-195677 (also corresponding to US 2004-0233271A1) are devoted to improving the extraction efficiency of light power from EL sources, where individual micro ball lenses are placed mostly contacting with each of the EL sources to extract the light as much as possible and refract it towards the image plane (OPC drum surface in case of electrophotography). FIG. 22 depicts an arrangement employing micro ball lenses. This technique includes two effects, i.e., (1) capturing the light and (2) holding the light. By placing a lens very close to a light source, the lens can capture more light. This follows from the fact that the solid angle from the light source that can be captured by a lens in front of the light source progressively increases as the distance between the light source and the first surface of the lens decreases. In this way, any lens works well to capture more light if it is positioned close to or in contact with a light source.

In addition to this effect, a ball lens has characteristics that enable it to hold the light inside the lens because of the total internal reflection that takes place when light rays are introduced inside the ball lens. In this way, a ball lens might work well in terms of efficient extraction of the light from diffuse light sources.

However, a ball lens is not suitable at all for transferring the light that is captured inside the ball. It is very hard to get a good image on an image plane without suffering aberration by using a ball lens, namely, all the light rays collected hardly gather into one point on an image plane. That is, a poorly converged/spread image is obtained, and this brings a problem of poor modulation. This problem becomes serious when there is a demand of increase of focus depth, namely, the distance between the lens and the image plane. This demand that the OPC drum should be kept at a certain distance from the light source occurs for various reasons, for example, the tolerance of the position of the surface of the OPC drum when it rotates and so forth. To meet this demand, a ball lens is not an option for achieving a well-designed surface to get a good image since the surface of a ball lens is just a spherical surface. In order to eliminate as much aberration as possible, the surface of a lens should have a complex geometry. It is quite difficult to make such a surface on a ball lens.

Another problem with a ball lens is that a ball lens can suffer chromatic aberration. As an EL source has a broad wavelength distribution, chromatic aberration also leads to a poor image quality and therefore leads to poor modulation and loss of light. In order to eliminate chromatic aberration, there are various techniques, such as to adapt a lens with an aspheric surface or an achromatic lens; however, this can not be applied to a ball lens. Thus, the technique using a ball lens is not suitable for transferring the light with a good modulation without aberration although it is easy to collect light.

Another technique for applying diffuse light sources to electrophotography is to combine the light sources with a coupling optical system, which is something like a fiber. This technique is used in an LED printer, where a so-called GRIN (Gradient Index) lens is employed in an array form together with an array of LED sources. As examples of an LED printer, there are K. Matsuda, et al., "High-Speed Color Printer Engine," OKI Technical Review, Vol. 70, No. 2, April, 2003 and U.S. Pat. No. 6,646,670B2. A GRIN lens is sold by many companies, for example, Nippon Sheet Glass Co. Ltd., Tokyo, Japan. In this example, a GRIN lens performs a function of collecting and transferring the light for multiple LED sources. Therefore, the number of GRIN lenses is less than that of the LED sources, in which case the GRIN lens can be erected into an image system with the same magnification. A problem of this system is that the coupling efficiency is low and not cost effective, while transfer characteristics are comparatively good.

SUMMARY OF THE INVENTION

It is an object of this invention to overcome the above-noted problems of conventional electrophotographic printers using diffusive light sources, and, more particularly, to provide a print system that makes efficient use of diffuse light sources while keeping a good modulation property.

It is a further object of the present invention to provide an image capturing or scanning system with improved optics to pick up diffuse light reflected from the surface of a document or other surface bearing an image.

According to the present invention, there is provided an optical system for an electrophotographic imaging device using diffusive light sources, comprising: an array of diffusive light sources; a first lens disposed to receive light emitted from two or more of the light sources of the array; an aperture plate disposed to receive light from the first lens, the aperture plate comprising a plurality of apertures each for passing light emitted by a respective one of the diffusive light sources of the array and for blocking light from other ones of the electro-luminescent light sources; and a second lens disposed to receive the light after passing through the plurality of apertures and to focus the light onto an image plane.

According to the present invention, there is further provided an optical print head comprising an optical system for an electrophotographic imaging device using diffusive light sources, the optical system including: an array of diffusive light sources; a first lens disposed to receive light emitted from two or more of the light sources of the array; an aperture plate disposed to receive light from the first lens, the aperture plate comprising a plurality of apertures each for passing light emitted by a respective one of the diffusive light sources of the array and for blocking light from other ones of the electro-luminescent light sources; and a second lens disposed to receive the light after passing through the plurality of apertures and to focus the light onto an image plane.

According to the present invention, there is also provided a method of electrophotographic imaging using diffusive light sources, comprising: providing an array of diffusive light sources; positioning a first lens to receive light emitted from two or more of the light sources of the array; providing an aperture plate disposed to receive light from the first lens, the aperture plate comprising a plurality of apertures each for passing light emitted by a respective one of the diffusive light sources of the array and for blocking light from other ones of the electro-luminescent light sources; and positioning a second lens to receive the light after passing through the plurality of apertures and to focus the light onto an image plane. The method may further comprise controlling magnification by selecting a ratio of numerical apertures of the first lens and the second lens and control of intensity distribution of pixels on the image plane by selecting sizes of the apertures of the aperture plate.

According to the present invention, there is further provided a method of fabricating an optical system for an electrophotographic imaging device using diffusive light sources, the method comprising: providing an array of diffusive light sources on a substrate; positioning a first lens to receive light emitted from two or more of the light sources of the array; providing an aperture plate at a position to receive light from the first lens, the aperture plate comprising a plurality of apertures each for passing light emitted by a respective one of the diffusive light sources of the array and for blocking light from other ones of the electro-luminescent light sources; and positioning a second lens to receive the light after passing through the plurality of apertures and to focus the light onto an image plane.

According to the present invention, there is also provided an optical scanner for scanning a document, comprising: a first lens disposed to receive light emitted from two or more image pixels on a document; an aperture plate disposed to receive light from the first lens, the aperture plate comprising a plurality of apertures each for passing light emitted by a respective one of the diffusive light sources of the array and for blocking light from other ones of the electro-luminescent light sources; a second lens disposed to receive the light after passing through the plurality of apertures and to focus the light onto an image plane; and a photodetector disposed at the image plane to receive light from the second lens.

According to the present invention, there is also provided an optical pickup head comprising: a first lens disposed to receive light emitted from two or more image pixels on a document; an aperture plate disposed to receive light from the first lens, the aperture plate comprising a plurality of apertures each for passing light emitted by a respective one of the diffusive light sources of the array and for blocking light from other ones of the electro-luminescent light sources; a second lens disposed to receive the light after passing through the plurality of apertures and to pass the light onto an image plane; and two or more photodetectors disposed at the image plane to receive light from the second lens.

According to the present invention, there is also provided a method of picking up an image of a document, comprising: positioning a first lens to receive light emitted from two or more image pixels on a document; providing an aperture plate disposed to receive light from the first lens, the aperture plate comprising a plurality of apertures each for passing light emitted by a respective one of the image pixels on the document and for blocking light from other ones of the image pixels on the document; and positioning a second lens to receive the light after passing through the plurality of apertures and to pass the light onto two or more photodetectors.

According to the present invention, there is also provided a method of fabricating an optical pickup head, the method comprising: positioning a first lens to receive light emitted from two or more image pixels on a document; providing an aperture plate at a position to receive light from the first lens, the aperture plate comprising a plurality of apertures each for passing light emitted by a respective one of the image pixels on the document and for blocking light from other ones of the image pixels on the document; positioning a second lens to receive the light after passing through the plurality of apertures and to pass the light onto an image plane; and disposing two or more photodetectors as the image plane to sense the light from the second lens.

Any of the above devices and methods may include one or more of the following features alone or in combination. The array of light sources can comprise an m×n array of electro-luminescent light sources positioned in alignment with the apertures. The first lens can be disposed between 50-100 microns from the array. The second lens can have a smaller NA than the first lens. The first lens can be cut in first planes at both edges with a distance Lx from an axis of the first lens to make contact surfaces for adjacent first lenses. The first lens can also be cut in second planes orthogonal to the first planes. The array can comprise an interlaced layout of diffusive light sources, and first lenses and the apertures are arranged in a matching interlaced layout to that of the diffusive light sources. The first lens can be disposed to collect light of the one or more diffusive light sources with a predetermined cone angle. The apertures can have varying sizes to control intensity distribution of light focused on the image plane. The first lens can be achromatic and the second lens can have a structure that eliminates chromatic aberration.

BRIEF DESCRIPTION OF THE DRAWINGS

The above and other objects, features and advantages of the present invention will be more clearly understood from the following detailed description taken in conjunction with the accompanying drawings, described in brief below.

DETAILED DESCRIPTION

Figure 1:
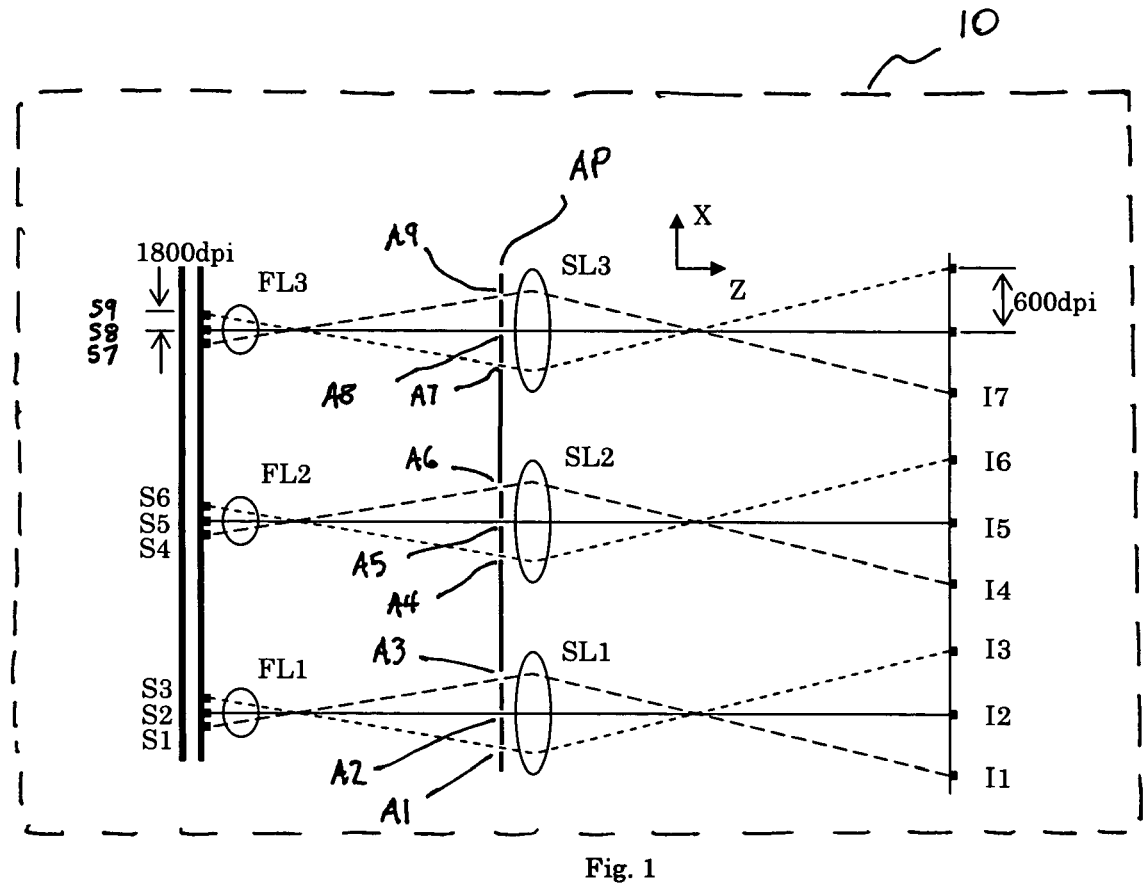
FIG. 1 shows an exemplary optical system for use in an electrophotographic printing system according to the present invention.

FIG. 1 shows an exemplary optical system according to the present invention. This system is for use in an optical print head or exposure head 10. This system includes a first lens array FL1, FL2, FL3, a second lens array SL1, SL2, SL3 and an aperture plate A providing an array of apertures A1, A2, A3, ... A9. The first and second lens arrays are of such a size that they cover one or multiple light sources S1, S2, S3, ... S9 which are supported on a substrate 51. Apertures A1, A2, A3, ... A9 are in a one-to-one correspondence with light sources S1, S2, S3, ... S9. I1, I2, I3, ..., I9 represent the pixel images formed on the OPC surface. The light sources S1, S2, S3, ... S9 are controlled by a controller (not shown) to emit light in accordance with image data stored in a memory (not shown).

Figure 2:
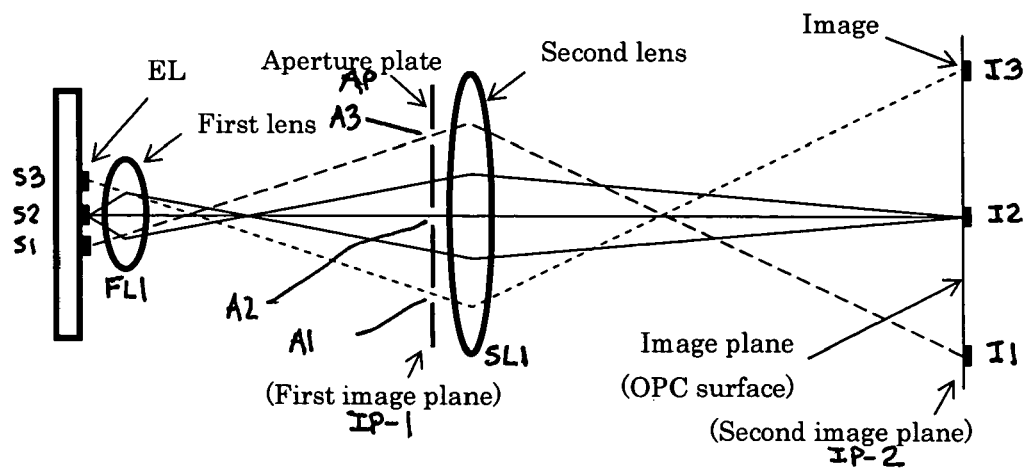
FIG. 2 illustrates a subsystem of the FIG. 1 optical system.

FIG. 2 shows the system magnification and optical configuration for a subsystem of FIG. 1. In FIG. 2, first lens FL1 is preferably placed very close to the three EL sources S1, S2, S3, for instance, with 50 microns separation. In this way, the viewing angle from an EL source S1, S2, S3 against the first lens FL1 increases so that the first lens FL1 collects more light. The first lens FL1 performs a role of collecting the light. It should be noted that the first lens FL1 could give an inverted image of EL sources S1, S2, S3 on the first image plane IP-1. A plate A with the same number of apertures A1, A2, A3 as the number of EL sources S1, S2, S3 may be inserted around the first image plane IP-1 in order to block the light coming from other EL sources, in which case the aperture plate A has an effect to increase the modulation. Then, the second lens SL1 is placed after the aperture plate A to deliver light up to the second image plane IP-2 (for example, an OPC drum surface positioned a certain distance away from the second lens SL1). The second lens SL1 performs a function of delivering the light to the second image plane IP-2 with a desired distance. This system is characterized by including individual functions of collecting the light, locking the stray light and delivering the trimmed light.

As shown in FIG. 2, the image spacing on second image plane IP-2 can be different from that of EL sources S1, S2, S3. This follows from the result that the magnification of this lens system is not equal to one. In the case of an electrophotographic printer, there is typically a need to deliver a lot of EL light and also a need to deliver the light far away. As pointed out above, these objectives tend to be at cross purposes to one another. To achieve these competing objectives, first lens FL1 is positioned close to EL sources S1, S2, S3; in other words, the first lens FL1 is placed so that the viewing angle, more technically, numerical aperture (NA), becomes large. On the other hand, in order to deliver the light far away, the second lens SL1 is provided with a larger focal length, i.e., it has a small NA. The array of first lenses, second lenses, and apertures in the aperture plate may be a linear array or a multidimensional array.

The paraxial magnification Mag of the optical system is written under paraxial approximation as:

$$\text{Mag} = NA_O/NA_I \quad (4)$$

where $NA_O$ and $NA_I$ are the numerical aperture for the object space (EL side) and image space (OPC side), respectively.

Consequently, the paraxial magnification that determines the image spacing can be greater than one in this case. When the magnification is larger than one, the spacing of the image on the second image plane IP-2 (OPC surface) is larger than the spacing of the EL sources S1, S2, S3. In this case, if the image resolution is, for example, 600 dpi (dots per inch), then the EL array must be disposed with 1200 dpi spacing.

This configuration has an advantage in an overall system where a full length of EL sources is lying as shown in FIG. 1. FIG. 1 depicts plural sets of the subsystem (drawn in FIG. 2) in case of a magnification of three, where the image spacing (printing resolution) is 600 dpi (=42.333 microns) while EL spacing is 1800 dpi (=14.111 microns). To compare with the actual configuration of the printer, we may refer to the coordinate system, which is the right hand system in FIG. 1. In this example, one single lens shares three EL sources to make a 600 dpi image on the OPC surface. Each lens is aligned every 200 dpi (=0.127 microns), which relaxes the spacing required between two adjacent EL sources. This relaxation of spacing for the lenses also helps decrease the chance of leakage of light from adjacent sets of ELs through a first lens. More concretely, the aperture plate A blocks unnecessary light from adjacent sets of ELs that emanates with large emission angle. The aperture plate A may not be essential for a certain condition, for example, the case where the required resolution is not so large. The present invention provides an inexpensive and small-sized print head that is less than half the size of that of a conventional laser printer and LED printer.

Figure 3:
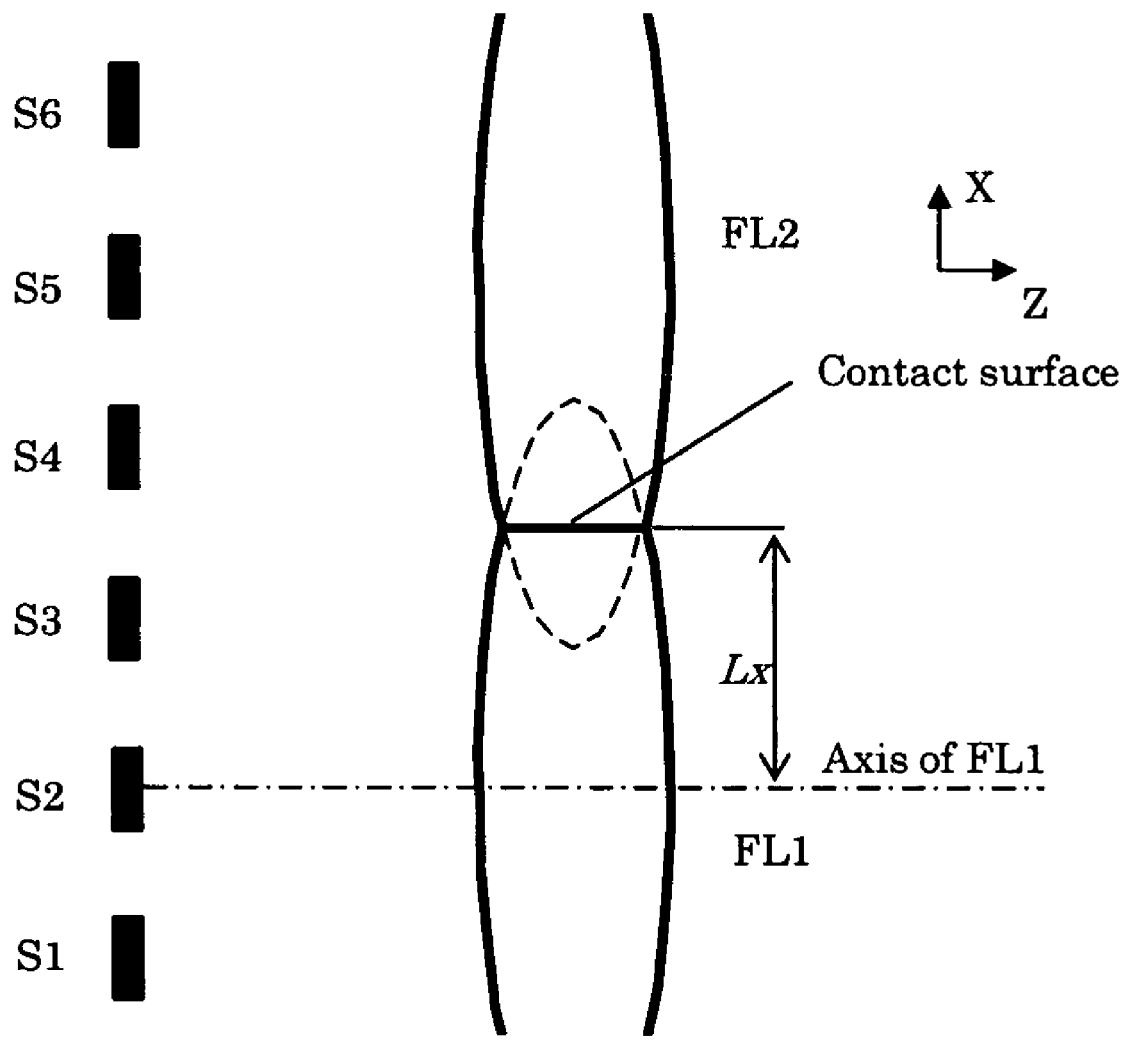
FIGS. 3-5 illustrate another embodiment of the present invention which provides a system in which the magnification is close to one and not a lot of light is needed.
Figure 4:
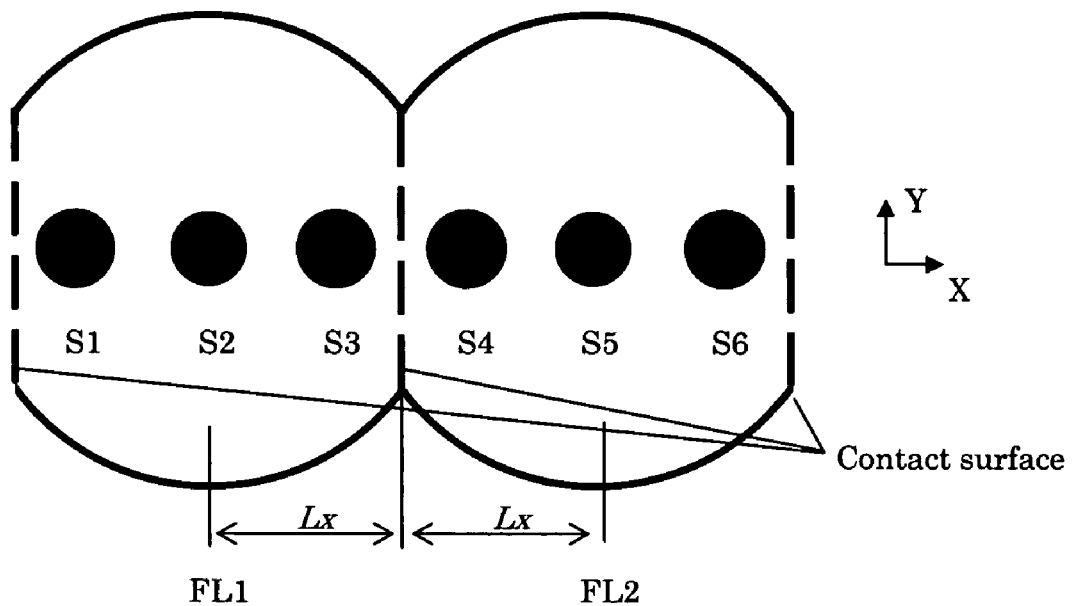
Figure 5:
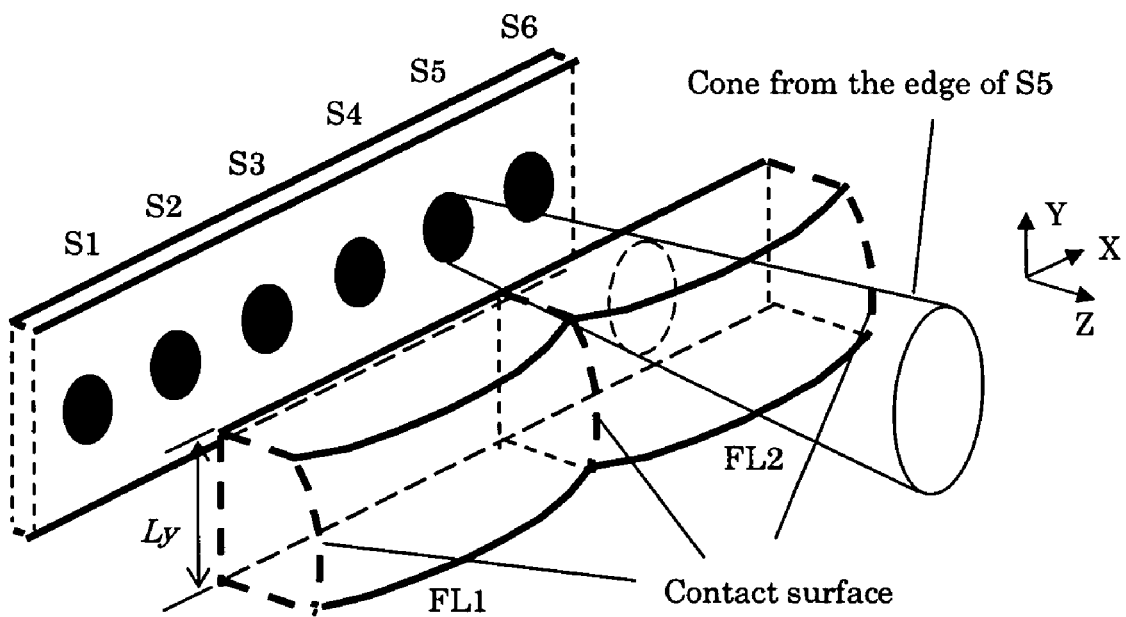

FIGS. 3-5 illustrate another embodiment of this invention which provides a system in which the magnification is close to one and not a lot of light is needed. FIG. 3 shows a top view of the optical system. FIG. 4 depicts a front view of the optical system and how two adjacent lenses can contact each other. FIG. 5 is a perspective view of the case where the lenses are also cut flat in the horizontal plane. Again, in this embodiment, one single lens shares three EL sources. A first lens FL1 shares EL sources S1, S2 and S3. A first lens FL2 shares EL sources S4, S5 and S6. A first lens FL3 shares EL sources S7, S8 and S9. A difference in this embodiment (compared to FIG. 1) is that the spacing between lenses is insufficient so that two adjacent lenses could contact each other at the contact surface at one side of the lens. The other side is similarly contacted by an adjacent lens as well. The lens may be cut in the YZ plane at both edges with, for example, a distance Lx from the axis of the lens to make contact surfaces as depicted in FIG. 3 and FIG. 4. Thick dotted lines show the contact surfaces at which each lens is cut. Also, a first lens can be cut additionally in the XZ plane to make a block type lens as in FIG. 5. Necessary lens diameter is determined by necessary cone angle for each EL source. If it is known how much light is needed per one EL source in advance, this means that necessary cone angle from which a first lens should collect and focus the light from the EL source is determined. Then, for example, for three ELs shared by one lens as in FIG. 5, first of all, the first lens should have such a size that is larger than the cone diameter with the predetermined cone angle spanned from at least the central EL. As long as the vertical size of a first lens is kept larger than the predetermined cone diameter at the entrance surface of a first lens, the first lens may be cut at top and bottom leaving vertical length Ly as in FIG. 5. Thin dotted lines represent allowable maximum cone diameter of the light emitted from the central EL source intersecting the lens entrance surface.

Otherwise, light that emanates towards around the vertical plane does not pass through the lens and may be absorbed or scattered by other materials. On the other hand, the light that passes the lens spreading in around the horizontal plane other than what is focused by the lens will be deflected or be eventually vignetted by an aperture plate which may be positioned after a first lens.

Similarly, a horizontal size of a first lens is restricted by necessary cone angle for EL sources positioned at around both edges of a first lens. With respect to the case where the system magnification is close to one, a first lens may contact with adjacent first lenses. Then, the contact surfaces may cut the lens at a certain distance, for example Lx in FIG. 3 and FIG. 4, so that two EL light sources positioned at around the edges of a first lens (S1, S3, S4 and S6 in FIG. 3 and FIG. 4) can have the same cone angle with the central EL. However, this is just preferable, and the contact surface could be much closer to the center of a first lens because the image from an EL source around the edge of a first lens is inverted, meaning that the light desired to be collected and focused is in another cone spanning diagonally across a first lens.

Figure 6:
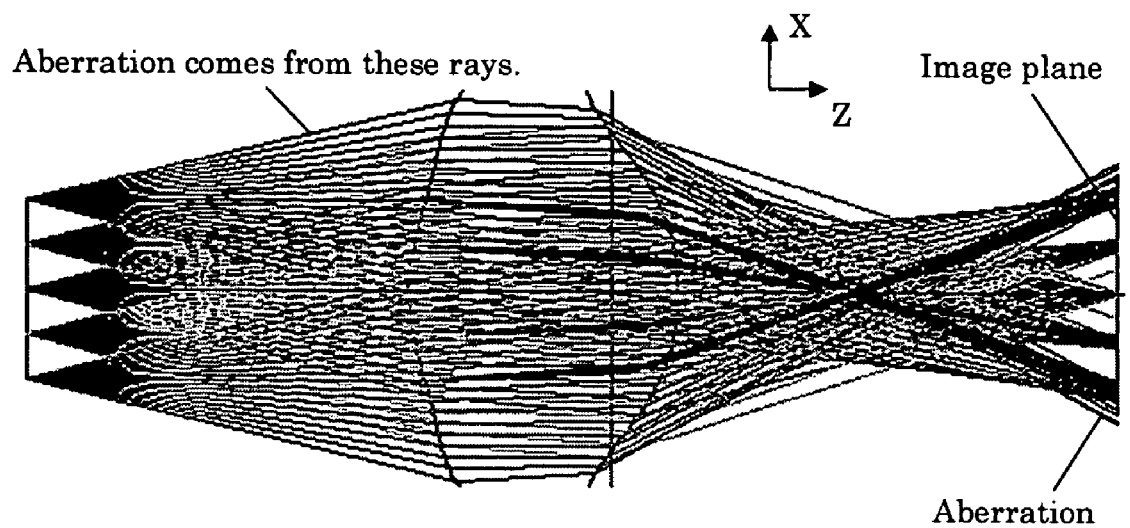
FIG. 6 shows a ray trace simulation result of the FIGS. 1 and 2 embodiment where a first lens shares five EL sources and only a predetermined cone angle of light is traced and otherwise light spreading to all directions is simply ignored.

FIG. 6 shows a ray trace simulation result using commercial optical design software, ZEMAX™, for a first lens sharing five EL sources where only a predetermined cone angle of light is traced and otherwise light spreading to all directions is simply ignored. The EL sources are disposed with 300 dpi (=84.667 microns) separation and the effective focal length is 0.458 and the numerical apertures for object space $NA_O$ and image space $NA_I$ are 0.259 and 0.241, respectively. The magnification of this system is, as calculated, Mag=−1.1, where the negative sign stands for inverted image. As in FIG. 6, looking at the light from the top EL source as shown in the drawing, it has aberration at the image plane. This aberration mostly comes from the uppermost rays and may not be used or vignetted by an aperture plate (not shown) that could be placed around the image plane. For this reason, a first lens can be cut in the YZ plane at a much closer position to its center than it is cut in the XZ plane.

Figure 7:
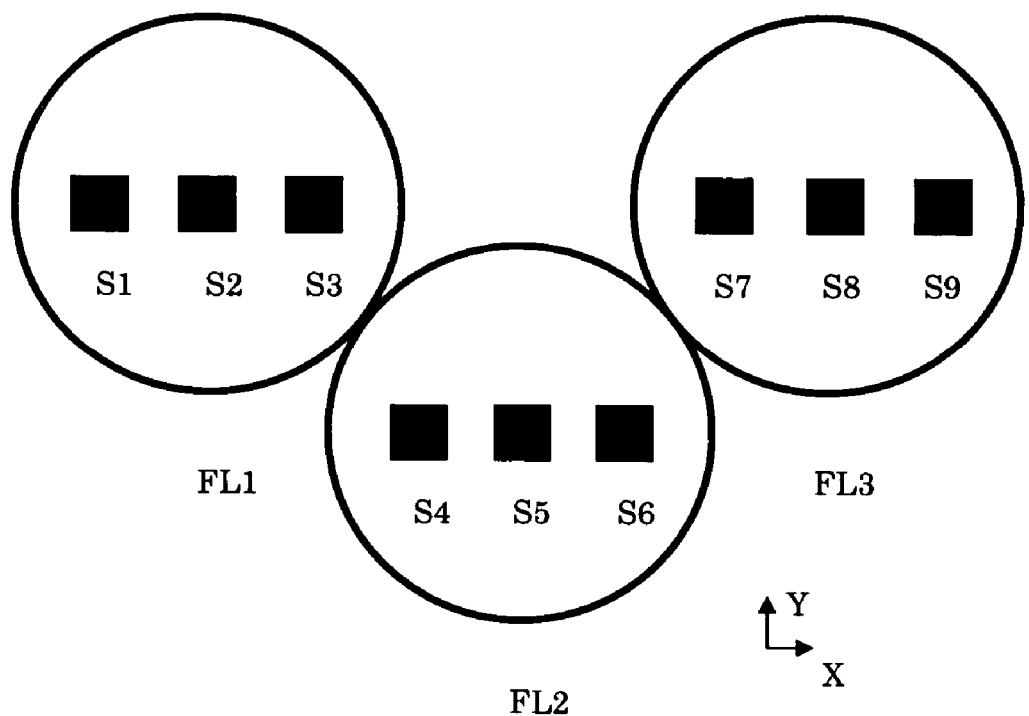
FIG. 7 is one exemplary configuration of the EL sources, with square EL sources and an interlaced layout of EL sources and first lenses.

As an alternative to cutting the first lens, a system may be employed implementing a so-called interlaced positioning of EL sources and using a matrix driving technique so that each first lens does not contact each other. FIG. 7 is one exemplary configuration with square EL sources and an interlaced layout of EL sources S1, S2, S3, . . . S9 and first lenses FL1, FL2, FL3.

With respect to system efficiency and EL size, the efficiency to extract the light from EL sources relates to not only the cone angle at which the EL source views a first lens but also the area size of an EL source. Now, the relation between some parameters will be explained using the following symbols to denote the parameters as in Table 1.

TABLE 1

| Symbols for general representation of parameters | |
| --- | --- |
| Radius or edge length of latent image (m) | $R_I$ |
| Min. irradiance for latent charge of unit area (W/m²) | P |
| Radius or edge length of EL (m) | $R_E$ |
| EL central radiance (W/sr · m²) | $I_0$ |
| Half cone angle (rad) | θ |

Below, the case of a square pixel of the image is calculated. The area of one pixel of latent image is calculated as:

$$R_I^2 (m^2) \quad (5)$$

The minimum irradiance to create one pixel of latent image on the OPC surface is $$P * R_I^2 (W) \quad (6)$$

On the other hand, the area of EL source is:

$$R_{EL}^2 (m^2) \quad (7)$$

The radiance inside the cone is, from equation (3):

$$\pi * I_0 * \sin^2 \theta (W/m^2) \quad (8)$$

The power of EL light inside the cone is calculated as:

$$R_{EL}^2 * \pi * I_0 * \sin^2 \theta (W) \quad (9)$$

Equating equation (6) and equation (9), we get:

$$R_{EL}^2 * \pi * I_0 * \sin^2 \theta = P * R_I^2 \quad (10)$$

Alternatively we get an inverse relation between EL size and half cone angle:

$$R_{EL} * \sin \theta = R_I * (P/\pi I_0)^{0.5} \quad (11)$$

Figure 8:
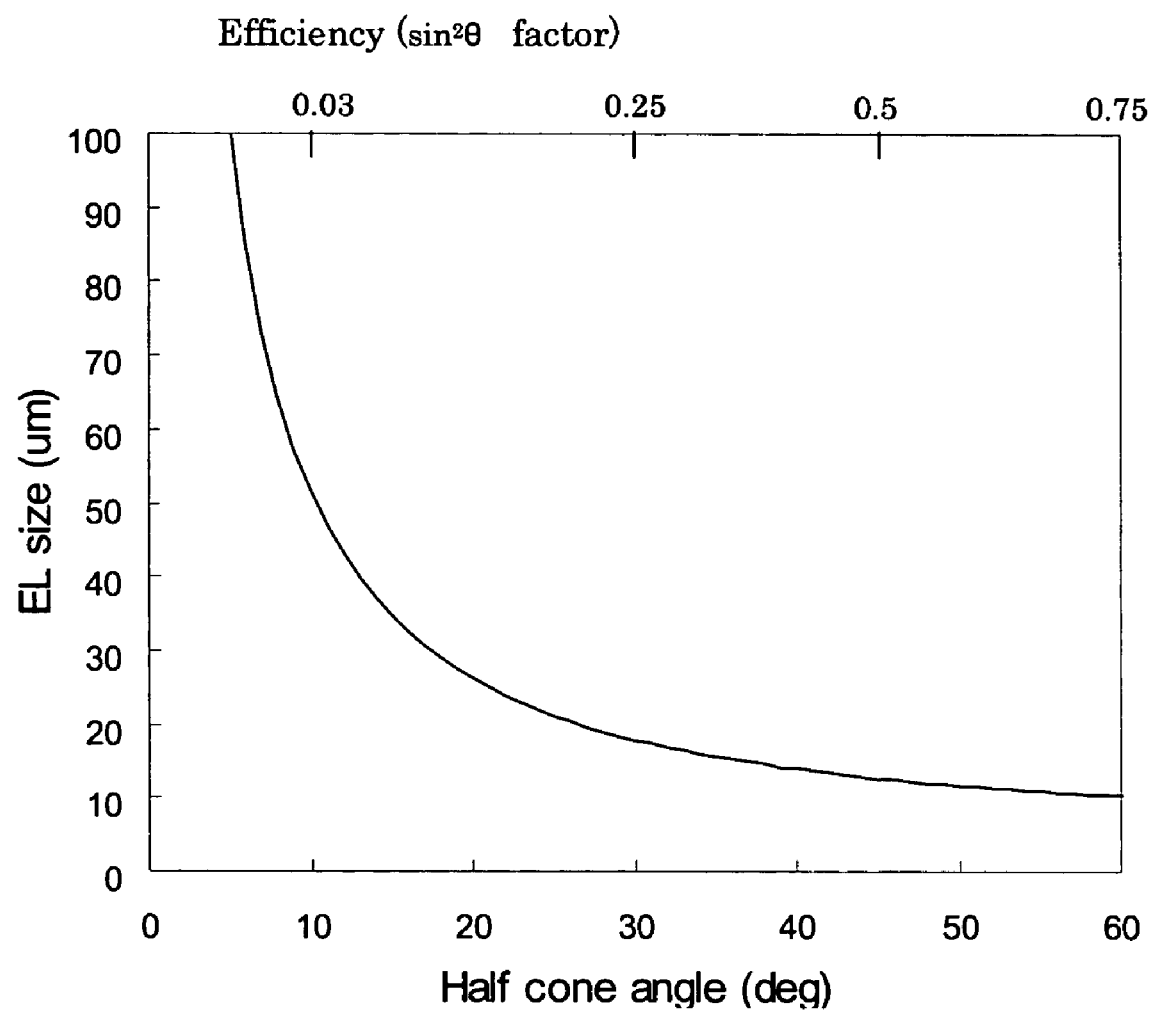
FIG. 8 is an approximate plot showing the relation between EL size and half cone angle.

It should be noted that equation (9) and equation (10) hold for the case of circular EL and its circular image. If the left hand side is regarded as variables while the right hand side is regarded as being fixed, equation (11) gives the relation between EL size and cone angle. FIG. 8 is an approximate plot of EL size versus half cone angle with fixed parameters listed in Table 2, showing an inverse relation between EL size and half cone angle.

TABLE 2

| Fixed parameters for example calculation | |
| --- | --- |
| $R_I$ (m) | $40e^{-6}$ |
| P (W/m²) | 5 |
| $I_0$ (W/sr²) | 100/π |

Figure 9:
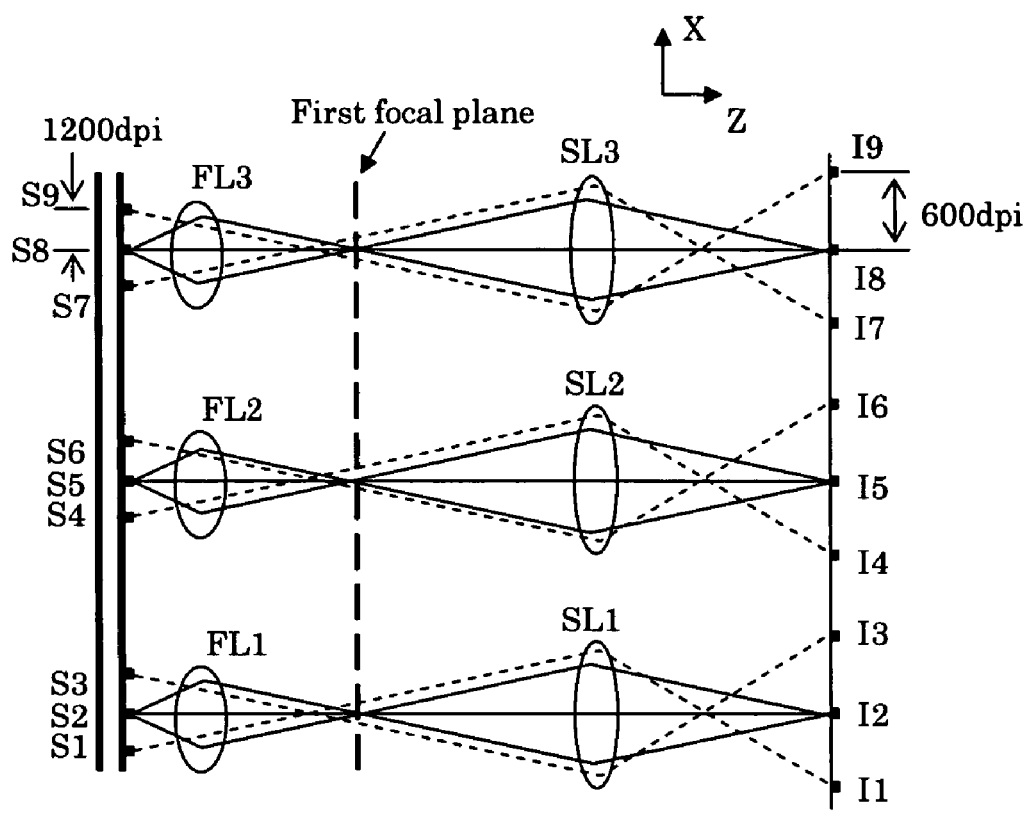
FIG. 9 illustrates another embodiment of the present invention in which the magnification is close to 2.0.

In FIG. 8, the number on the second horizontal axis represents the power efficiency, which is $\sin^2 \theta$ factor. The wider a first lens takes the cone angle, the more the efficiency increases. For example, for the printing resolution of 600 dpi, we can obtain as much as 25% (very high) efficiency for a 600 dpi printing system by designing a first lens with the magnification of −2.0 taking 30 degree half cone angle (60 degree full cone angle) to EL sources with the size of 20 microns disposed with center-to-center spacing of 1200 dpi (21.2 microns) and employ a second lens with the magnification of −1.0, which is the magnification of 2.0 as a whole system (FIG. 9). An aperture plate may be placed around the first focal plane (not shown). This is one of the best modes of this invention.

Figure 10:
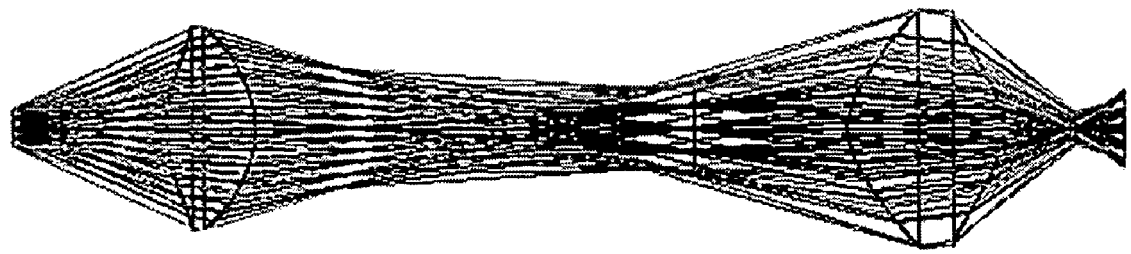
FIG. 10 shows a ray trace simulation result of a similar system with system magnification of 1.5.

FIG. 10 shows results of the design of a similar system with the system magnification of 1.5, i.e., ray-trace simulation result for a system with the system magnification of 1.5.

With respect to modulation and aperture, as emphasized above, a Lambertian light source emits light in all directions in a 180 degree hemisphere and only a part of the light can be collected. Thus, a great portion of the entire light that is not used would become stray light and eventually gives rise to a decrease of modulation. Degradation of modulation leads to decrease of printing resolution. In other words, there is needed as good modulation as possible in order to obtain clearly distinguishable latent image on each pixel on the OPC surface.

Figure 11:
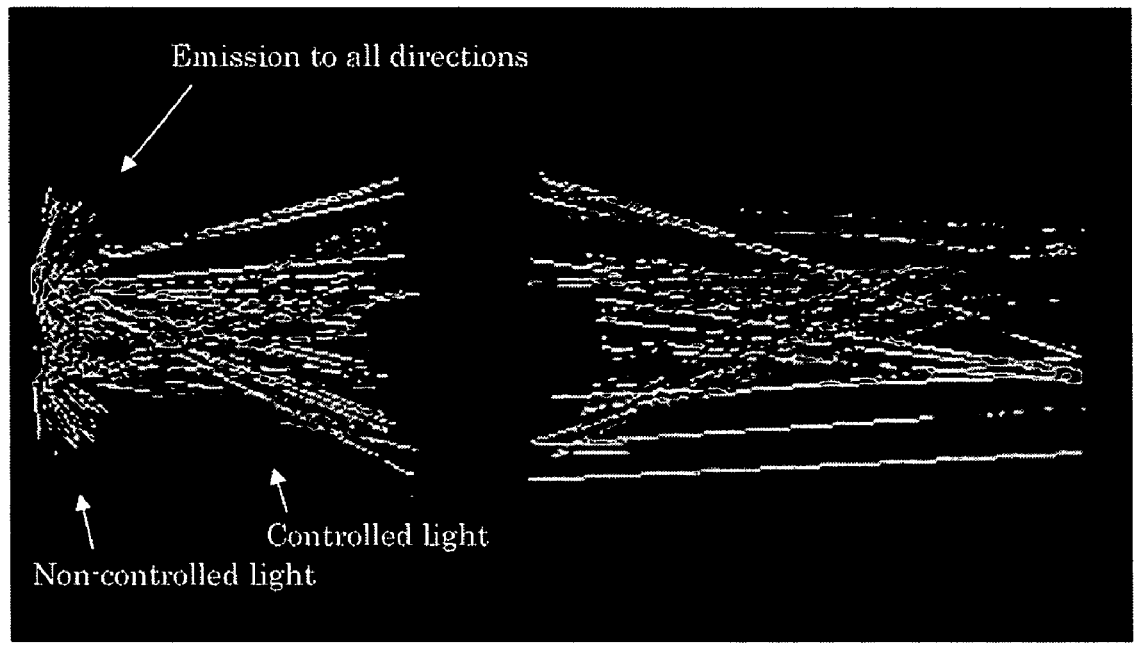
FIG. 11 represents a result of non-sequential simulation based on the Monte Carlo method for an actual model where EL sources are emitting actual Lambertian light, where non-desired rays scatter around and strike somewhere in the image plane.

One aspect of this invention is the use of an aperture plate to cut stray light off and increase modulation. In one embodiment, the aperture plate can have opening holes of the same number as the EL sources and may be placed preferably around the first focal plane where each ray makes a small spot so that there is no mixture of rays. The invention is not limited with respect to the shape of the holes, as hole shape is arbitrary. FIG. 11 depicts a 3D solid model layout as a result of non-sequential simulation for the model of five EL sources and a single first lens. FIG. 11 represents a result of non-sequential simulation based on Monte Carlo method for an actual model where EL sources are emitting actual Lambertian light and hence there is always a probability that non-designed rays scatter around and strike somewhere in the image plane. One first lens shares five EL sources disposed with 300 dpi spacing and is designed to collect light within a cone of half cone angle of 15 degrees. Non-controlled rays are relatively weaker in intensity than controlled rays because the intensity is governed by the Lambertian law and decreases by a factor of cosine as emitting angle becomes large. So the stray light may not give a significant effect but still gives some effect.

Figure 12:
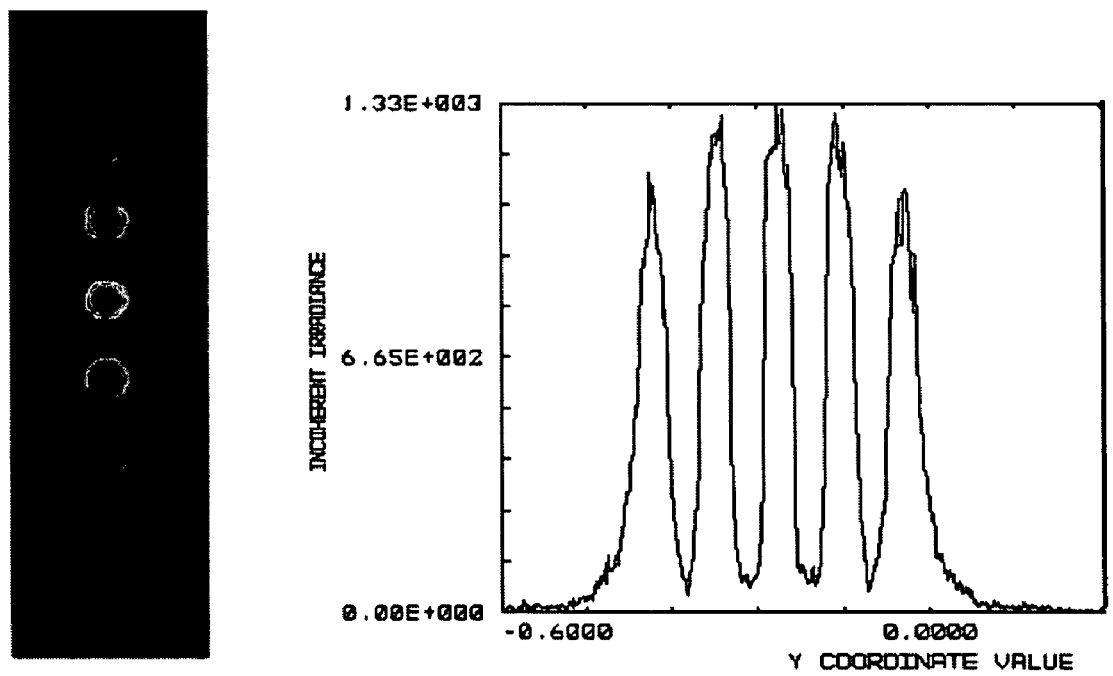
FIGS. 12 and 13 show a contour and a cross sectional plot of intensity distribution for the same model as FIG. 11 with and without an aperture plate positioned around 5 microns before the focus.
Figure 13:
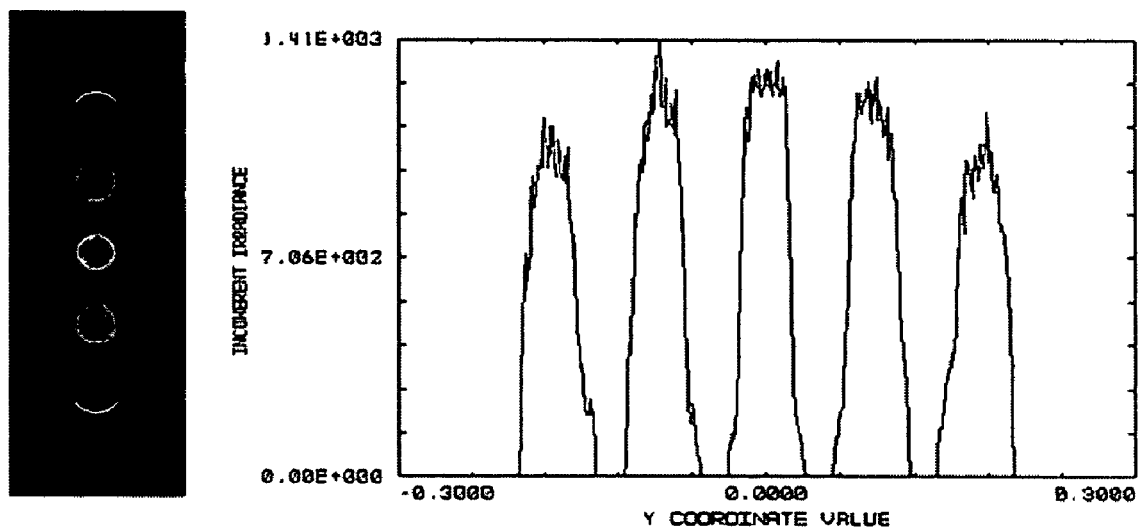

FIG. 12 and FIG. 13 show a contour and a cross-sectional plot of intensity distribution for the same model as FIG. 11 with and without aperture plate positioned around 5 microns before the focus. FIG. 12 is a contour and cross-sectional plot as a result of non-sequential simulation with 5 EL sources and single first lens without aperture plate, and FIG. 13 is contour and cross sectional plot as a result of non-sequential simulation with five EL sources and single first lens with aperture plate. There can be seen some stray light at the foot of each image in FIG. 12 while each flux of beam is separate and there is no mixture of light in FIG. 13. Modulation could be calculated about 90% in FIG. 12 and 100% in FIG. 13.

Figure 14:
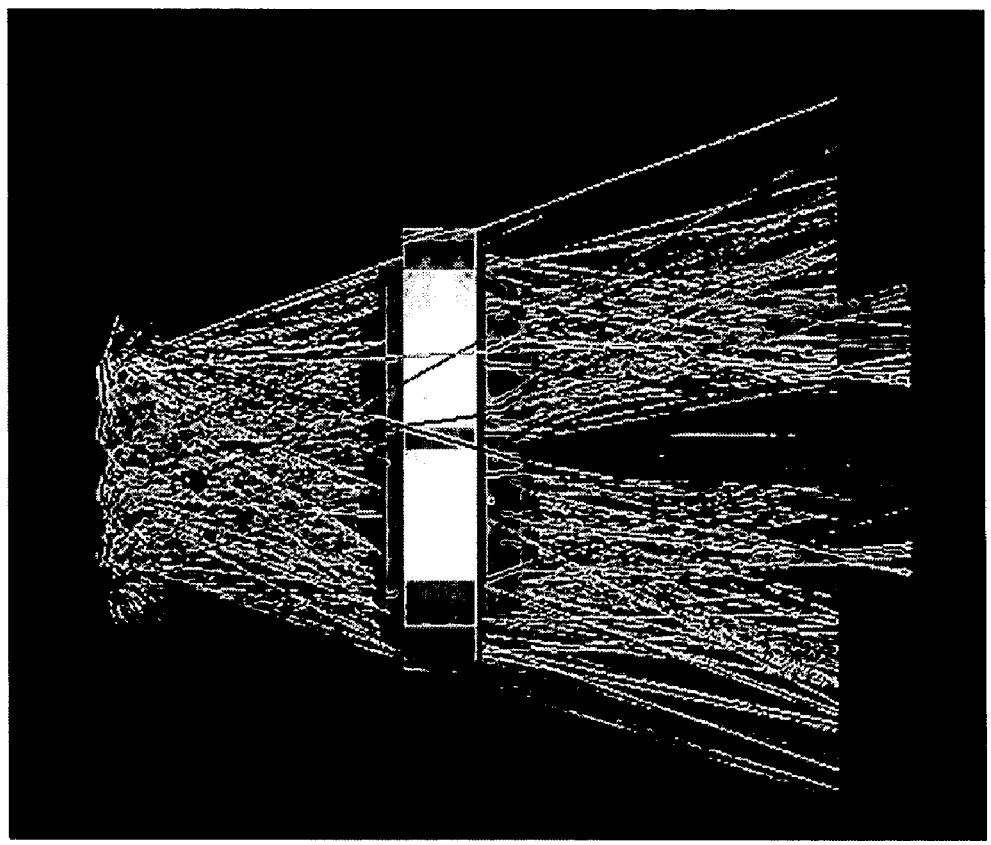
FIG. 14 depicts a 3D solid model layout of a non-sequential simulation for a model with ten EL sources and two first lenses for the case of the presence of an aperture plate.
Figure 15:
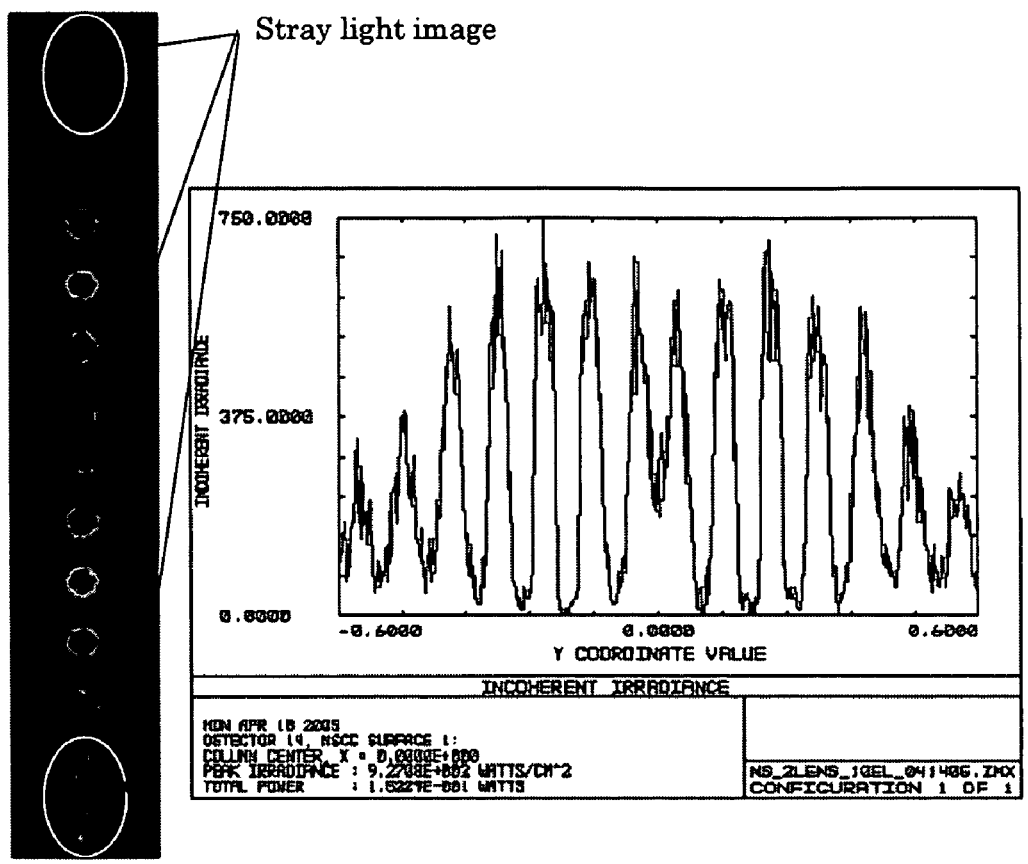
FIG. 15 shows a contour and cross-sectional plot as a result of non-sequential simulation with ten EL sources and two first lenses without an aperture plate, showing two stray light images on both sides, which supposedly should not exist, and mixture of light between the central two images, with modulation deteriorating down to about 50%.
Figure 16:
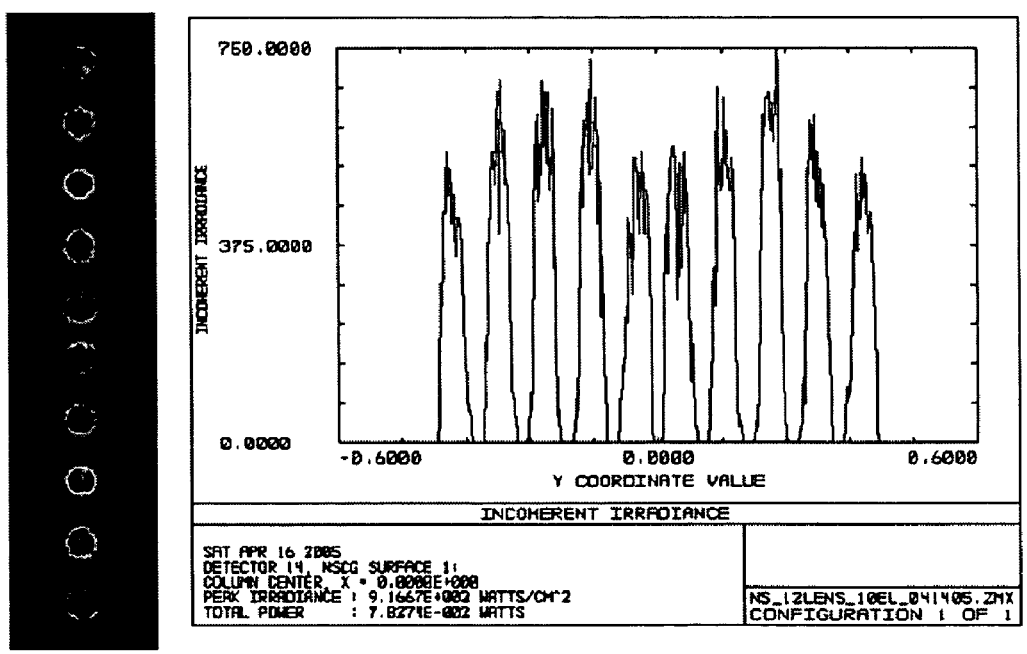
FIG. 16 shows a contour and cross-sectional plot as a result of non-sequential simulation with ten EL sources and two first lenses with an aperture plate, with a result that only ten images exist and modulation is 100%.

The next example is an optical system designed for ten EL sources disposed with 600 dpi spacing and two first lenses. FIG. 14 shows a 3D solid layout of a non-sequential simulation for the model with ten EL sources and two first lenses with aperture plate. FIG. 14 depicts a three-dimensional solid model layout for the case of the presence of aperture plate. When two first lenses are positioned close to each other, an unnecessary image from an EL source shared by the other first lens can be created on both sides and the center. FIG. 15 shows a contour and cross sectional plot as a result of non-sequential simulation with ten EL sources and two first lenses without aperture plate. In FIG. 15, there are two stray light images on both sides, which supposedly should not exist and mixture of light between central two images, which looks deteriorating modulation down to about 50%. FIG. 16 shows contour and cross sectional plot as a result of non-sequential simulation with ten EL sources and two first lenses with aperture plate. On the other hand, with aperture plate, ten images only exist and modulation is 100% in FIG. 16.

Figure 17:
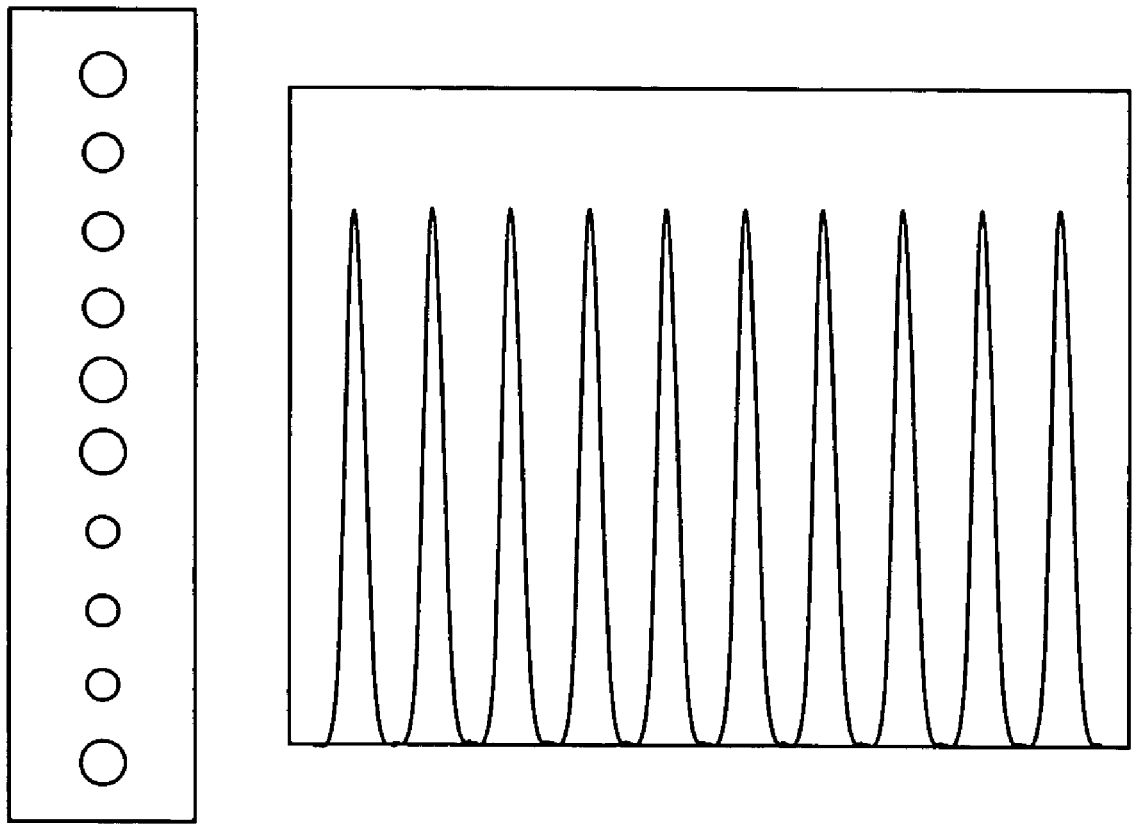
FIG. 17 illustrates an aspect of the invention wherein the apertures of the aperture plate have a variable hole size and shows the resultant intensity distribution of images.

FIG. 17 shows another embodiment of the invention employing a variable hole size in the aperture plate and resultant intensity distribution of images. In FIG. 17, the size of holes in the aperture plate can be changed for each ray so that the distribution of the images is uniform. When the images are like FIG. 16, the size of the holes are arranged in reverse proportion to the magnitude of the images to compensate the distribution, as shown in FIG. 17. Preferably, the size of the holes can be larger at around the vicinity of the edge of each first lens and smaller around the center of each first lens.

It is noted that the above discussion assumes, for simplicity, monochromatic light instead of actual broad band emission spectrum of EL light. A broad band spectrum may cause chromatic aberration that leads to degradation of efficiency and modulation from a perspective of all spectra. But this problem can be also solved by using achromatic first lenses and second lenses that eliminate chromatic aberration. All of the above-discussed embodiments may be combined with achromatic first lenses to provide alternative embodiments of this invention.

It is further noted that the shapes of the EL sources and the holes in an aperture plate are not limited to either circular or square shape but can be any number of different shapes. Also, the system magnification is not limited to a specific number but can take any value depending on the application of the printer.

Figure 18:
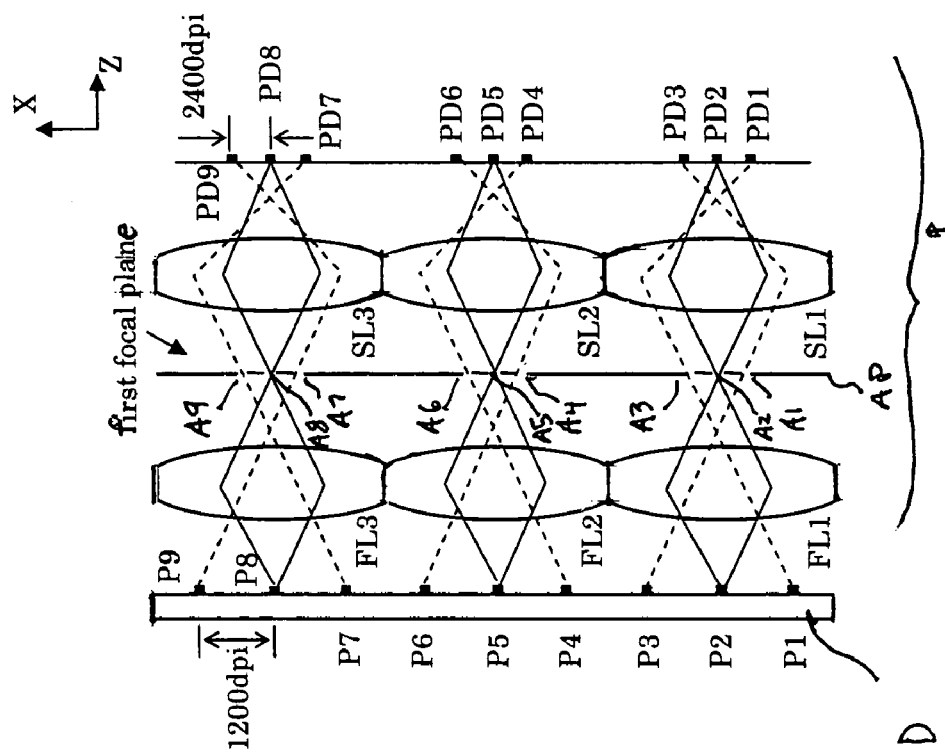
FIGS. 18 and 19 depict a scanning device employing the principles of the present invention.
Figure 19:
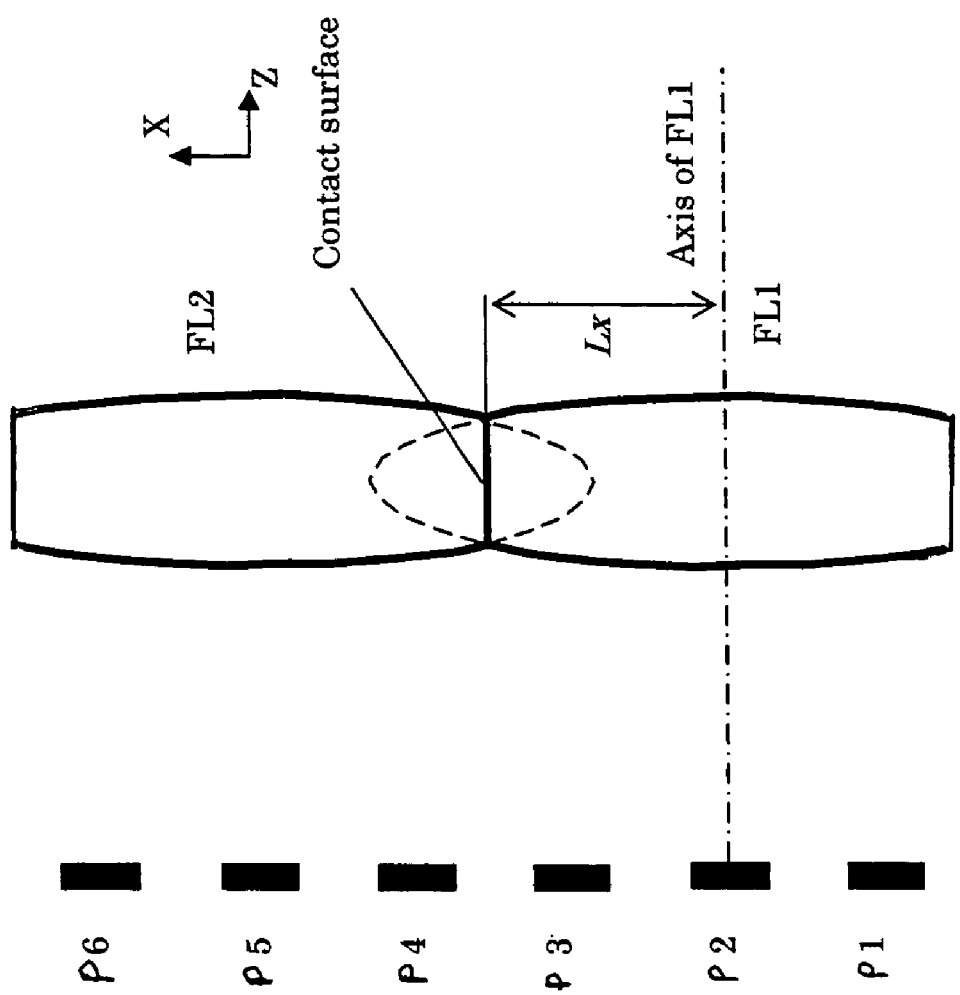
Figure 20:
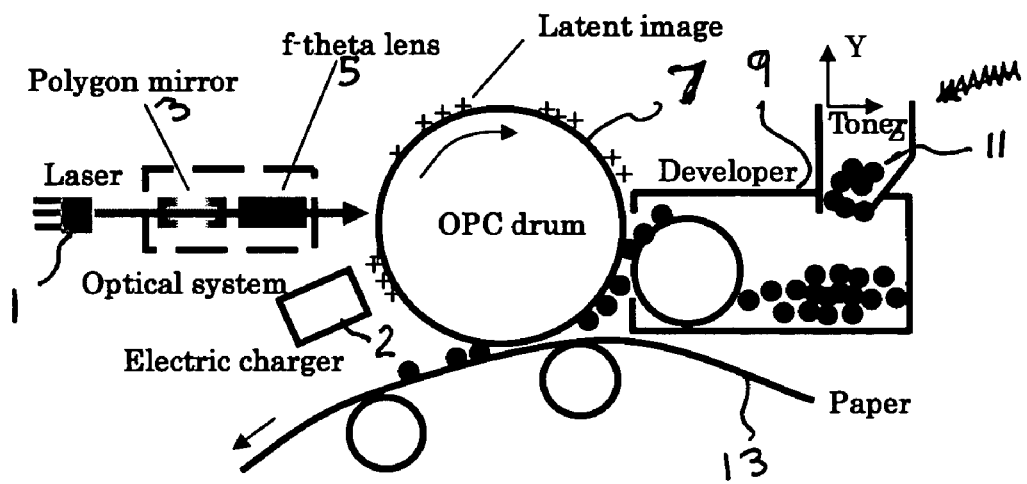
FIG. 20 depicts a basic configuration of a conventional laser printer.
Figure 21:
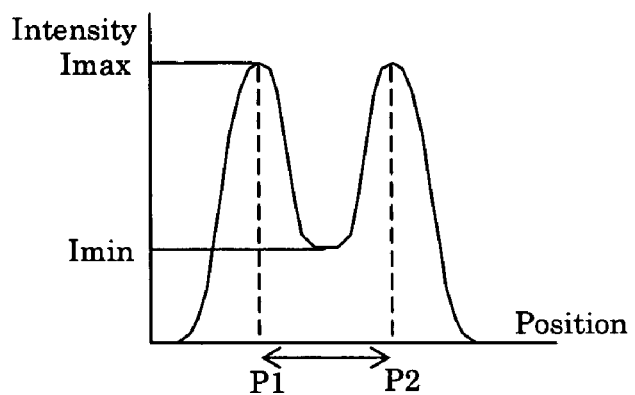
FIG. 21 shows the intensity from two adjacent light sources.
Figure 22:
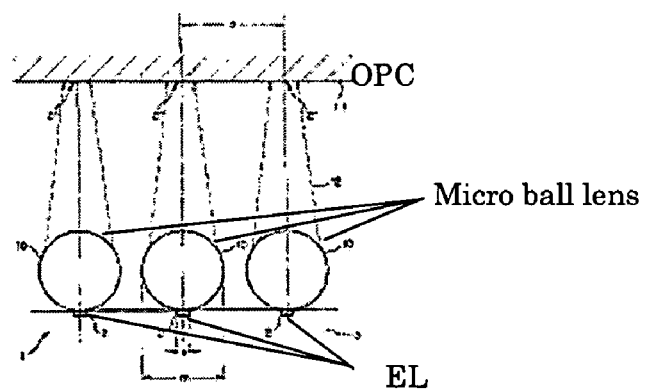
FIG. 22 shows a conventional ball lens system for an LED printer.

FIGS. 18 and 19 depict a document image capture device or scanner for reading an original image on a document, employing principles of the present invention. FIG. 18 illustrates a scanner, wherein the system magnification is 0.5. But the system magnification is not necessarily less than 1 in the case of a scanner according to the present invention. The advantage of a system magnification less than 1 for a scanner is that the scanning head (or pickup head) could be made small because the total focal length could become short as shown in FIG. 18. But in applications where a large scanning head is acceptable, the system magnification could be any number. A system magnification equal to or smaller than would exists where a pickup head requires high efficiency and high modulation but the spacing between the first lens and the photo detector is not necessarily large.

The system employs an optical pickup head 30. The overall scanner system includes a light source unit (not shown) for emitting a light beam, and an optical deflector (not shown) for deflecting the light beam from the light source unit so as to cause scanning of the surface of the document D to be scanned. The optical pickup head 30 picks up the reflected light from the document surface. In such system, when light from the light source unit and the deflector strikes the surface of a document, the reflected light is diffusive. Of course, the scanner may scan other types of objects besides printed documents.

FIG. 18 shows an exemplary optical system of the pickup head according to this embodiment. This system includes a first lens array FL1, FL2, FL3 that picks up reflected light from the document D, a second lens array SL1, SL2, SL3 and an aperture plate AP providing an array of apertures A1, A2, A3, ... A9. The first and second lens arrays are of such a size that they cover one or multiple image pixels P1, P2, P3, ... P9 on document D. Apertures A1, A2, A3, ... A9 are in a one-to-one correspondence with image pixels P1, P2, P3, ... P9. PD1, PD2, PD3, ..., PD9 represent photo detectors or photosensitive elements that sense the light output from the second lenses SL1, SL2, SL3. The outputs from photo detectors PD1, PD2, PD3, ..., PD9 may be stored in a memory (not shown) and may be used to drive a printer, such as that described in the above embodiments.

In FIG. 18, the first lenses FL1, FL2, FL3 are preferably placed very close to the image pixels P1, P2, P3, ... P9 on document D, for instance, with 50 microns separation. In this way, the viewing angle from an image pixel against a first lens FL1, FL2, FL3 increases so that the first lens collects more light. The first lens FL1, FL2, FL3 performs a role of collecting the light. It should be noted that the first lenses FL1, FL2, FL3 could give an inverted image of image pixels P1, P2, P3, ... P9 on the first focal plane. A plate AP with the same number of apertures A1, A2, A3, ... A9 as the number of image pixels P1, P2, P3, ... P9 may be inserted around the first focal plane in order to block the light coming from other image pixels, in which case the aperture plate AP has an effect to increase the scanning resolution. Then, the second lenses SL1, SL2, SL3 are placed after the aperture plate AP to deliver light up to the array of photodetectors PD1, PD2, PD3 which is positioned a certain distance away from the second lenses SL1, SL2, SL3. The lenses SL1, SL2, SL3 perform a function of delivering the light to the photodetectors with a desired distance. This system is characterized by including individual functions of collecting the light, locking the stray light and delivering the trimmed light. The array of first lenses, second lenses, photodetectors, and apertures in the aperture plate may be a linear array or a two dimensional array.

FIG. 18 illustrates a scanner, where the system magnification is 0.5. But the system magnification is not necessarily less than 1 in the case of a scanner according to the present invention. The advantage of the system magnification less than 1 for a scanner is that the scanning head (or pickup head) could be made small because the total focal length could become short as shown in FIG. 18. But in applications where a large scanning head is acceptable, the system magnification could be any number.

FIG. 19 shows the arrangement similar to that of FIGS. 3-5, wherein shaping of lenses is required because lenses have insufficient spacing so that, without shaping, two adjacent lenses could contact each other at the contact surface at one side of the lens. In FIG. 18, this is the case with both the first lens array and the second lens array. Thus, according to the invention, the lens is cut in the YZ plane at both edges with, for example, a distance Lx from the axis of the lens to make contact surfaces as depicted in FIG. 19. Thick dotted lines show the contact surfaces at which each lens is cut. Also, a lens can be cut additionally in the XZ plane to make a block type lens as in FIG. 5. Necessary lens diameter is determined by necessary cone angle to catch the light from each pixel on the document D. If it is known how much light is needed per one pixel in advance, this means that necessary cone angle from which a first lens should collect and focus the light from the pixel is determined. Then, for example, for three pixels shared by one lens, first of all, the first lens should have such a size that is larger than the cone diameter with the predetermined cone angle spanned from at least the central one of the three pixels. As long as the vertical size of a first lens is kept larger than the predetermined cone diameter at the entrance surface of a first lens, the first lens may be cut at top and bottom leaving vertical length Ly as in FIG. 5. Thin dotted lines represent allowable maximum cone diameter of the light emitted from the central pixel intersecting the lens entrance surface.

Otherwise, light that emanates towards around the vertical plane does not pass through the lens and may be absorbed or scattered by other materials. On the other hand, the light that passes the lens spreading in around the horizontal plane other than what is focused by the lens will be deflected or be eventually vignetted by an aperture plate which may be positioned after a first lens.

Similarly, a horizontal size of a first lens is restricted by necessary cone angle for pixels positioned at around both edges of a first lens. With respect to the case where the system magnification is close to one, a first lens may contact with adjacent first lenses. Then, the contact surfaces may cut the lens at a certain distance, for example Lx, so that two pixels positioned at around the edges of a first lens (P1, P3, P4 and P6 in FIG. 19) can have the same cone angle with the central pixel. However, this is merely preferable, and the contact surface could be much closer to the center of a first lens because the image from pixel around the edge of a first lens is inverted, meaning that the light desired to be collected and focused is in another cone spanning diagonally across a first lens. It should be noted the image capture device or scanner of the FIGS. 18 and 19 embodiment may include any and all of the modifications of the first lens, the second lens and the aperture plate described above in connection with the embodiments of FIGS. 1-17.

Although the preferred embodiments of the present invention have been described and disclosed for illustrative purposes, those skilled in the art will appreciate that various modifications, additions, and substitutions are possible, without departing from the scope and spirit of the invention as set forth in the accompanying claims.

What is claimed is:

1. An optical system for an imaging device using diffusive light sources, comprising:
   an array of diffusive light sources that emits light in accordance with image data;
   a first lens disposed to receive light emitted from two or more of said diffusive light sources of said away and to invert an image generated with the image data;
   an aperture plate disposed to receive light from said first lens, said aperture plate comprising a plurality of apertures each for passing light emitted by a respective one of said diffusive light sources of said away and for blocking light from other ones of said diffusive light sources; and
   a second lens disposed to receive said light after passing through said plurality of apertures and to focus said light onto an image plane.

2. An optical system as in claim 1, wherein array comprises an m×n away of electro-luminescent light sources positioned in alignment with said apertures.

3. An optical system as in claim 1, wherein said first lens is disposed between 50-100 microns from said array.

4. An optical system as in claim 1, wherein said second lens has a smaller numerical aperture than said first lens.

5. An optical system as in claim 1, wherein said first and second lenses have magnifications that are different from one another.

6. An optical system as in claim 1, wherein a system magnification provided by said first lens and said second lens is greater than or equal to one.

7. An optical system as in claim 1, wherein said first lens is cut in first planes at both edges with a distance Lx from an axis of said first lens to make contact surfaces for adjacent first lenses.

8. An optical system as in claim 7, wherein said first lens is cut in second planes orthogonal to said first planes.

9. An optical system as in claim 1, wherein said array comprises an interlaced layout of diffusive light sources, and first lenses and said apertures are arranged in a matching interlaced layout to that of said diffusive light sources.

10. An optical system as in claim 1, wherein said first lens is disposed to collect light of said two or more diffusive light sources with a predetermined cone angle.

11. An optical system as in claim 1, wherein said aperture comprises said apertures of at least two different sizes to control intensity distribution of light focused on said image plane.

12. An optical system as in claim 1, wherein said first lens is achromatic and said second lens has a structure that eliminates chromatic aberration.

13. An optical system as in claim 1, wherein said array of diffusive light sources has Lambertian characteristics.

14. An optical system as in claim 13, wherein said away of diffusive light sources includes a plurality of electro-luminescencent lights.

15. An optical print head comprising:
   an optical system for an electrophotographic imaging device using diffusive light sources, said optical system including:
   an array of diffusive light sources that emits light in accordance with image data;
   a first lens disposed to receive light emitted from two or more of said diffusive light sources of said array and to invert an image generated with the image data;
   an aperture plate disposed to receive light from said first lens, said aperture plate comprising a plurality of apertures each for passing light emitted by a respective one of said diffusive light sources of said array and for blocking light from other ones of said diffusive light sources; and
   a second lens disposed to receive said light after passing through said plurality of apertures and to focus said light onto an image plane.

16. A print head as in claim 15, wherein array comprises an m×n array of electro-luminescent light sources positioned in alignment with said apertures.

17. A print head as in claim 15, wherein said first lens is disposed between 50-100 microns from said array.

18. A print head as in claim 15, wherein said second lens has a smaller numerical aperture than said first lens.

19. A print head as in claim 15, wherein said first lens is cut in first planes at both edges with a distance Lx from an axis of said first lens to make contact surfaces for adjacent first lenses.

20. A print head as in claim 19, wherein said first lens is cut in second planes orthogonal to said first planes.

21. A print head as in claim 15, wherein said array comprises an interlaced layout of diffusive light sources, and first lenses and said apertures are arranged in a matching interlaced layout to that of said diffusive light sources.

22. A print head as in claim 15, wherein said first lens is disposed to collect light of said two or more diffusive light sources with a predetermined cone angle.

23. A print head as in claim 15, wherein said aperture comprises said apertures of at least two different sizes to control intensity distribution of light focused on said image plane.

24. A print head as in claim 15, wherein said first lens is achromatic and said second lens has a structure that eliminates chromatic aberration.

25. A method of electrophotographic imaging using diffusive light sources, comprising:
- providing an away of diffusive light sources that emits light in accordance with image data;
- positioning a first lens to receive light emitted from two or more of said diffusive light sources of said away and to invert an image generated with the image data;
- providing an aperture plate disposed to receive light from said first lens, said aperture plate comprising a plurality of apertures each for passing light emitted by a respective one of said diffusive light sources of said away and for blocking light from other ones of said diffusive light sources; and
- positioning a second lens to receive said light after passing through said plurality of apertures and to focus said light onto an image plane.

26. A method as in claim 25, further comprising controlling magnification by selecting a ratio of numerical apertures of said first lens and said second lens.

27. A method as in claim 25, wherein intensity distribution of pixels on said image plane is controlled by selecting sizes of said apertures of said aperture plate.

28. A method of fabricating an optical system for an imaging device using diffusive light sources, said method comprising:
- providing on a substrate an away of diffusive light sources that emits light in accordance with an image data;
- positioning a first lens to receive light emitted from two or more of said diffusive light sources of said away and to invert image generated with the image data;
- providing an aperture plate at a position to receive light from said first lens, said aperture plate comprising a plurality of apertures each for passing light emitted by a respective one of said diffusive light sources of said away and for blocking light from other ones of said diffusive light sources; and
- positioning a second lens to receive said light after passing through said plurality of apertures and to focus said light onto an image plane.

29. An optical system for an imaging device using diffusive light sources, comprising:
- a plurality of diffusive light sources that emits light in accordance with image data;
- a first lens disposed to receive light emitted from said plurality of diffusive light sources and to invert an image generated with the image data;
- an aperture plate disposed to receive light from said first lens, said aperture plate having a plurality of apertures each for passing light emitted by a respective one of said diffusive light sources of said away and for blocking light from other ones of said diffusive light sources; and
- a second lens disposed to receive said light after passing through said plurality of apertures and to focus said light onto an image plane.

* * * * *